United States Patent

Sahashi et al.

Patent Number: 6,146,022
Date of Patent: Nov. 14, 2000

[54] HUB UNIT BEARING FOR WHEEL

[75] Inventors: Koji Sahashi, Mie-ken; Tomohide Mizoguchi, Shizuoka-ken; Eiji Tajima, Iwata; Keisuke Sone, Hamamatsu; Kazuhiko Hozumi, Fukuroi, all of Japan

[73] Assignee: NTN Corporation, Osaka-fu, Japan

[21] Appl. No.: 09/220,458

[22] Filed: Dec. 24, 1998

[30] Foreign Application Priority Data

Dec. 25, 1997 [JP] Japan ..................... 9-357986
Dec. 26, 1997 [JP] Japan ..................... 9-360556
Aug. 24, 1998 [JP] Japan ..................... 10-237575
Aug. 26, 1998 [JP] Japan ..................... 10-240583

[51] Int. Cl.[7] .............. B60B 37/00; F16D 3/22
[52] U.S. Cl. ........................ 384/544; 384/625
[58] Field of Search ................... 384/544, 625, 384/589; 301/105.1; 464/178, 182

[56] References Cited

U.S. PATENT DOCUMENTS

| 4,893,960 | 1/1990 | Beier et al. | 403/380 X |
| 5,536,098 | 7/1996 | Schwarzler | 384/544 X |
| 5,780,165 | 7/1998 | Fukumoto et al. | 384/625 X |
| 5,974,665 | 11/1999 | Frielingsdorf et al. | 384/544 X |

*Primary Examiner*—Richard M. Lorence
*Attorney, Agent, or Firm*—Arent Fox Kintner Plotkin & Kahn, PLLC

[57] ABSTRACT

A hub unit bearing for automotive wheel comprises an outer joint member of constant velocity universal joint, an axle hub and an axle bearing assembled into one unit, the axle hub and the outer joint member being separably joined in a socket-and-spigot joint fashion, face splines being formed in opposing end surfaces of the axle hub and the outer joint member, one of double rows of inner raceways of the axle bearing being formed in the outer joint member, and quench-hardened layers of the inner raceways and quench-hardened layers of the face splines being formed continuously. A heat-affected zone incident to the quench-hardened inner raceway of the outer joint member may also be formed continuously with a heat-affected zone incident to quench-hardened ball grooves of the outer joint member.

11 Claims, 17 Drawing Sheets

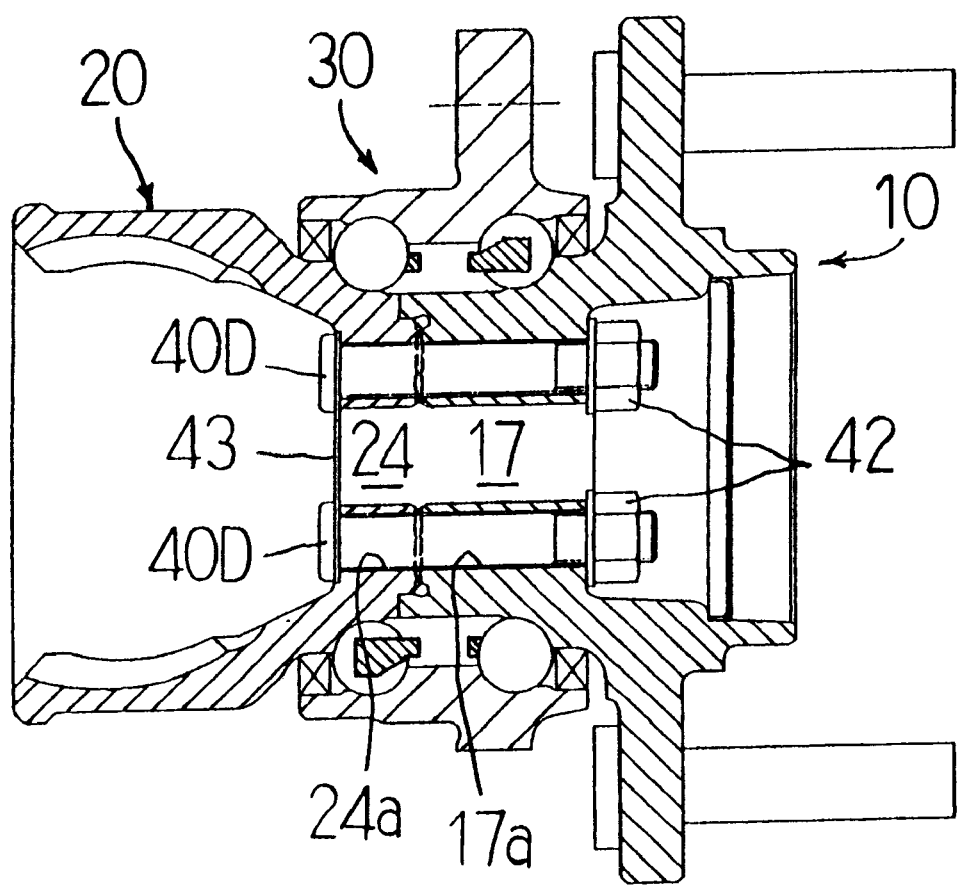

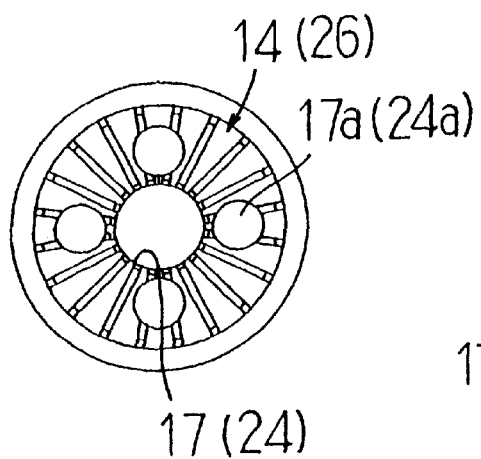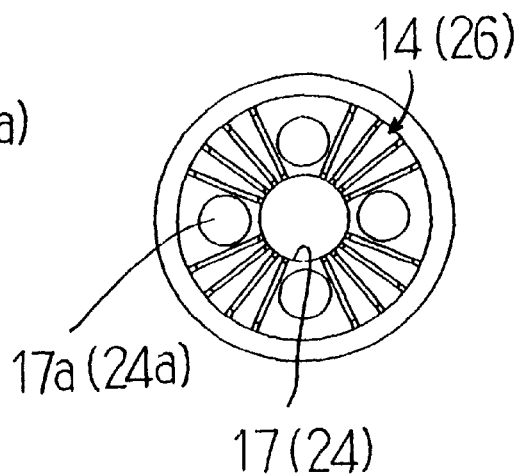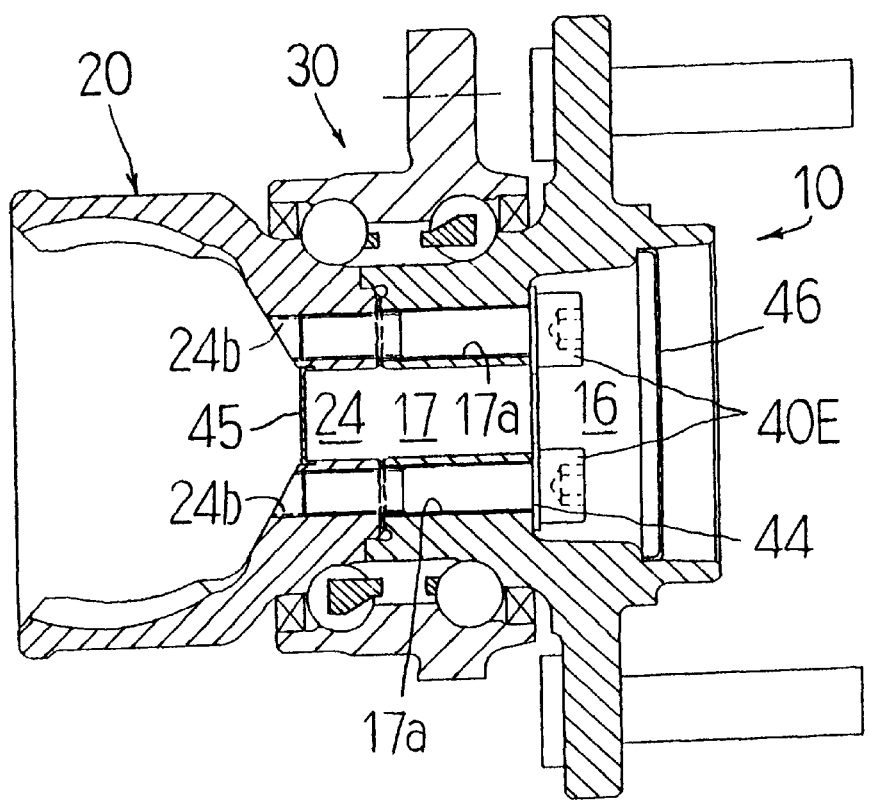

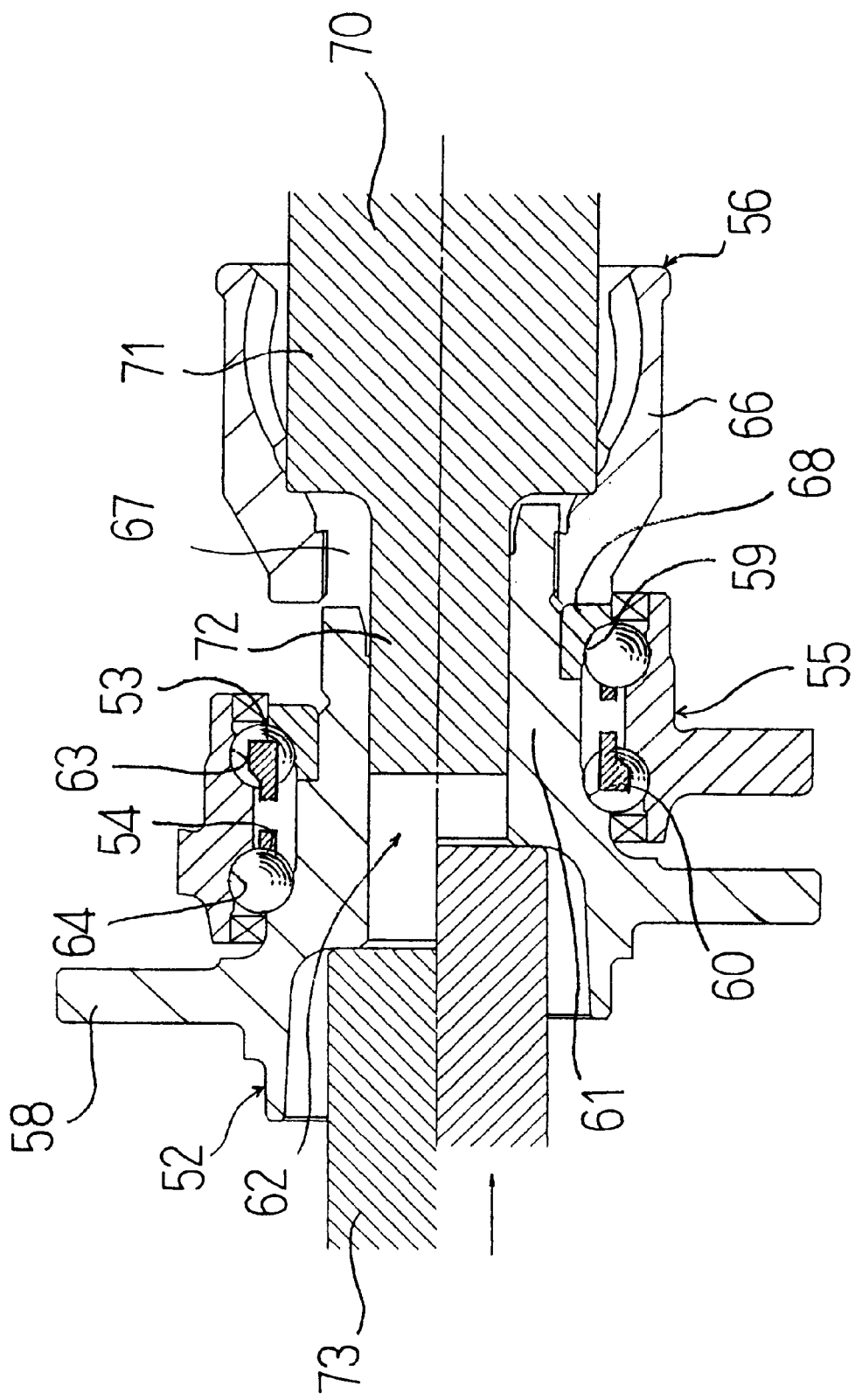

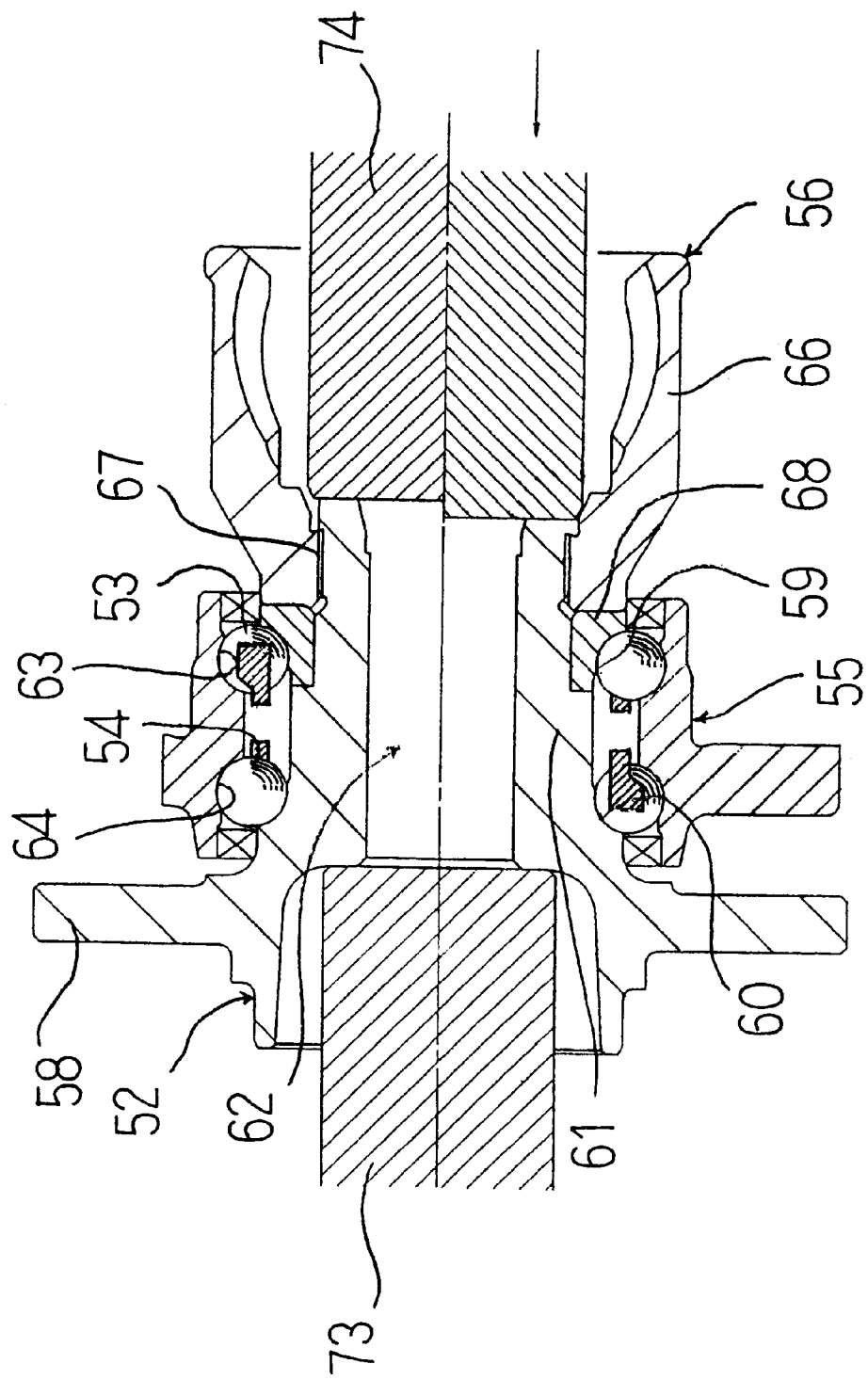

(Torque: 196 N·m, working angle: 10°)

(Torque: 490 N·m, working angle: 10°)

HUB UNIT BEARING FOR WHEEL

BACKGROUND OF THE INVENTION

1. Field of the Invention

The invention relates to a hub unit bearing for a driving wheel of an automobile, and more particularly to a unified bearing including an axle hub, an outer joint member of constant velocity universal joint and an axle bearing.

2. Prior Art

Power transmission system for transmitting the power from an automotive engine to driving wheels is required to cope flexibly with angular displacement and axial displacement caused by changes in relative positional relation between the engine and the wheels, and therefore, as shown in FIG. 9, for example, a driving shaft 1 is interposed between the engine and a driving wheel. One end of the driving shaft 1 is coupled to the differential gear through a sliding type constant velocity universal joint J1, while the other end is coupled to a driving wheel 2 through a fixed type constant velocity universal joint J2. Plunging of the sliding type constant velocity universal joint J1 absorbs the axial displacement. The fixed type constant velocity universal joint J2 can absorb only the angular displacement.

The fixed type constant velocity universal joint J2 is mainly composed of an inner joint member 4 fitted to the other end of the driving shaft 1, an outer joint member 3 coupled to an axle hub 7, plural balls 5 for transmission of torque interposed between pairs of ball grooves of the inner joint member 4 and outer joint members 3 and 4, and a retainer or cage 6 interposed between an outer spherical surface of the inner joint member 4 and an inner spherical surface of the outer joint member 3 for retaining the balls 5. The axle hub 7, carrying a wheel disc of the driving wheel 2, is rotatably supported by an axle bearing 8.

The axle hub 7, outer joint member 3 of constant velocity universal joint J2 and axle bearing 8 are assembled into a unit to compose a hub unit bearing H.

The axle bearing 8, which is a double row rolling bearing, is fixed to the car body through a knuckle joint 9, one 8a of the double rows of balls 8a and 8b lying outboard, and the other 8b inboard of the vehicle. The inboard ball row is subjected to hat from the outer joint member 3 of the constant velocity universal joint J2 receiving torque from the driving shaft 1, which in combination with poor heat radiating capability of the inboard side, requires very strict load conditions.

Since the axle hub 7 is coupled to the constant velocity universal joint J2 by means of bolts and others and is supported on the axle bearing 8, it is also subjected to and thermal effects from the constant velocity universal joint J2 and axle bearing 8. Thus, in the axle hub 7, a favorable cooling state is hardly obtained, and therefore the life of the hub unit bearing H is shortened by adverse thermal effects.

It is hence an object of the invention to increase the rigidity of the hub unit bearing to improve its durability, and also to realize a small-size and a compact design thereof.

It is another object of the invention to provide a hub unit bearing with an improved structure of the axle hub having an excellent cooling efficiency.

SUMMARY OF THE INVENTION

According to an embodiment of the invention, a hub unit bearing comprises an axle hub, an outer joint member of constant velocity universal joint, and an axle bearing assembled into a unit, at least one of double rows of inner raceways of the axle bearing being formed in the outer joint member, in which a hardened layer by quenching of the inner raceway part of the outer joint member and a hardened layer by quenching of ball grooves of the outer joint member are mutually connected via a heat-affected zone. For the outer joint member which is loaded with torque, the inner and outer quench-hardened layers connected via the heat-affected zone increase the rigidity, improving the torsion fatigue life and durability. As the rigidity is increased, the outer joint member may be formed in a thin wall thickness, and the unit is made compact.

Face splines may be formed in opposing end surfaces of the axle hub and the outer joint member, and a quench-hardened layer of the inner raceway part and a quench-hardened layer of the face spline part are connected. The rigidity of the outer joint member and the axle hub is thus increased, and so is the rigidity of the entire unit. The interconnection of quench-hardened layers of the inner raceway part and the face spline part may be effected in either of the outer joint member and axle hub, though, it is more advantageous to effect same in both of them. The outer joint member and axle hub are locked together in the rotating direction as the face splines formed in their respective end surfaces engage with each other for transmission of torque. Since the torque is transmitted by the face splines, any relative displacement in the rotating direction does not occur between the constant velocity universal joint outer member and the hub if a large torque acts in abrupt start or the like, which also contributes to prevention of generation of unusual sound.

The axle hub and outer joint member may be fitted in a socket-and-spigot joint fashion and separably tightened, facilitating alignment as well as adjustment of clearance of the axle bearing. Since the outer joint member and axle hub have double rows of inner raceways distributed on the individual outer circumferences, centering or alignment of the two is of great significance to the performance and life of the axle bearing. The centering is ensured by fitting the outer joint member and axle hub in a socket and spigot joint fashion. Such a socket-and-spigot joint is composed, for example, by an annular step formed in the outer circumference of the end of the outer joint member and an annular projection or a rim formed at the end of the axle hub, the outer diameter of the annular step and the inner diameter of the rim being set in an appropriate class of fit. Of course, it is also possible to form the rim and annular step in the outer joint member and the axle hub, respectively. Since one of double rows of inner raceways is formed in the outer joint member and the other in the axle hub, the axial dimension between the inner raceways varies depending on the axial dimension of the annular step. Therefore, by adjusting the axial dimension of the annular step, the clearance of the axle bearing can be controlled.

Moreover, by separably tightening the outer joint member and axle hub, the constituent elements such as outer joint member, axle hub and axle bearing can be replaced independently, so that it is economical as compared with replacement of the entire unit. Means of tightening separably may be realized by screw tightening, with a single bolt or a plurality of fixing bolts disposed in a circular pattern. Moreover, screw tightening the axle hub and the outer joint member with the face splines in engagement with each other therebetween results in the entire unit small and compact in the axial direction, which in turn brings the bearing center and the constant velocity universal joint center closer to each other, enhancing steering stability. Alternatively, the outer joint member and axle hub may be coupled by both fitting and splines.

According to another embodiment of the invention, a hub unit bearing comprises an axle hub, an outer joint member of constant velocity universal joint, and an axle bearing assembled into a unit, wherein at least one of double rows of inner raceways of axle bearing is formed in the outer joint member, wherein the outer joint member has a mouth and a shank, an end face of the mouth on the shank side abutting against the axle hub, and wherein the shank and the axle hub are coupled by fitting and serration, the fitting being effected between the double rows of rolling elements of the axle bearing. The outside diameter of the axle hub is proportionally expanded depending on the degree of interference at the fitting part, and if there is a raceway and therefore rolling elements on the fitting part, the bearing clearance control is complicated. Also deformation of the raceway shape, which impairs the durability of the bearing, can be caused depending on the axial position of the rolling elements and fitting part. Preferably, therefore, the fitting part should be situated at a position away from the rolling elements. By setting the length of the fitting part, length of the serration part, and the degree of interference of the fitting part in a proper range, permits the assembling of the hub unit bearing with the rigidity required as such by realistic method and pressing force.

The serration part may advantageously have an interference, and its length (S) longer than the length (L) of the fitting part (S>L). Any circumferential play in the serration part can cause abutting surfaces to abrade, leading to wear and fretting, an adverse effect on the bearing clearance, and the bearing rigidity being lowered. Accordingly, elimination of any play in the serration part is important for maintenance of the bearing performance. The specific relationship of the lengths (S>L) makes the press fitting very easy in that when assembling the outer joint member in the axle hub, the serrations of the serrated shank and the serrated hole come into contact first, and after the serrations are circumfertially matched, the press-fitting starts. On the contrary, once the press-fitting starts, relative rotation can hardly be effected, and so can the matching of the serrations.

The length of the fitting part may advantageously be ¼ or more of the fitting part shank diameter (D), and the degree of interference (I) may advantageously be in a range of $0 \leq I \leq 60$ μm. Since the fitting part is loaded with a bearing radial load, if shorter than the specified length setting, the surface pressure is higher, which can cause problem. Therefore, the position between the rolling elements and the length of the fitting part as specified may be advantageous. The lower limit of the degree of interference of the fitting part may be set at 0 from the aspect of the bearing rigidity, and the upper limit may be set at 60 μm so that the combined press-fitting force of the serration part and fitting part may not be more than the axial force of the nut.

The mouth of the outer joint member may advantageously be provided with a flat part at its bottom for receiving a pressing jig. When the shank of the outer joint member is forced into the axle hub, the press-fitting jig for pressing the outer joint member abuts against the flat part, ensuring that the pressing force acts correctly in the axial direction, thereby facilitating the press-fitting work.

According to other embodiment of the invention, the outer joint member an the axle hub may advantageously be joined together by staking an exposed end of the shank of the outer joint member. As compared with the case of tightening the axle hub and outer joint member by screwing the hub nut on to the shank of the outer joint member projecting from the axle hub, the weight and cost can be reduced by doing away with the hub nut. In this case, at least the end part of the shank of the outer joint member is preferably in a hollow tubular form. It is also possible to insert a spacer ring inside the axle hub and carry out the staking so that this spacer ring is embraced.

According to still other embodiment of the invention, a hub unit bearing comprises an axle hub coupled to a driving wheel, an axle bearing for rotatably supporting the axle hub through double rows of rolling elements, and an outer joint member of a constant velocity universal joint coaxially coupled to the axle hub for transmitting the power from a driving shaft to the axle hub, in which a shank of the axle hub has a tubular hollow structure throughout its length, the shank being fitted into an opening formed in the outer joint member to form a hollow unit structure. Such a hollow unit structure provides a favorable cooling effect for the axle hub, increasing the life of the axle hub, and simultaneously resulting in lighter weight and compact design of the hub unit bearing, reduction in the number of parts and lowering of cost.

Preferably, the shank of the axle hub is fitted into the opening of the outer joint member for fixing by staking or welding. The axle hub and the outer joint member can be integrally united by simple means such as caulking or welding even if the shank is of a hollow structure.

An inner surface of the opening in the outer joint member may advantageously be serrated or in a polygonal cross-section so that the shank of the axle hub is plastically deformed as it is press-fitted into the opening in the outer joint member, which ensures that the outer joint member and the axle hub are firmly joined together.

Referring now to the drawings, preferred embodiments of the invention will be described in detail.

BRIEF DESCRIPTION OF THE DRAWINGS

FIG. 2 through FIG. 6 are views similar to FIG. 1A showing modified arrangements respectively;

FIG. 7A and FIG. 7B are front views of a face spline part in FIG. 6;

FIG. 8 is a longitudinal sectional view similar to FIG. 1A showing a modified arrangement;

FIG. 17 and FIG. 18 are longitudinal sectional views illustrating the press-fitting of an axle hub into an outer joint member;

DESCRIPTION OF THE PREFERRED EMBODIMENTS

Figure 1:
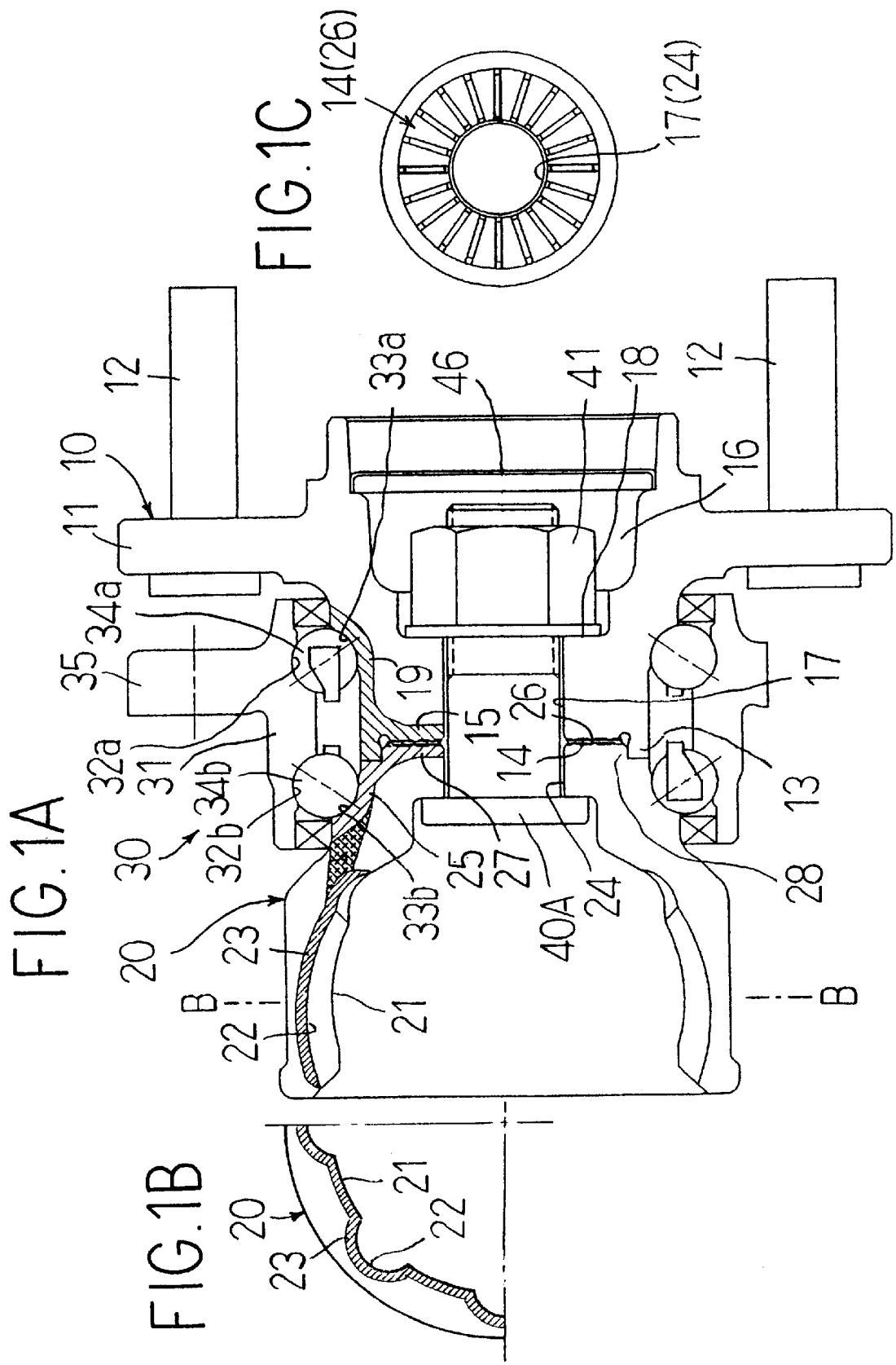
FIG. 1A is a longitudinal sectional view of a hub unit bearing according to an embodiment of the invention.
FIG. 1B is a sectional view taken along the line B—B in FIG. 1A.
FIG. 1C is a front view of a face spline part in FIG. 1A.

First, the hub unit bearing shown in FIG. 1A is mainly composed of an axle hub 10, an outer joint member 20 of constant velocity universal joint, and an axle bearing 30. In FIGS. 1A and 1B, which are sectional views, though, for the sake of clarity, hatching for expressing the section is omitted, while a hardened layer by quenching is indicated by hatching, and a heat-affected zone by cross hatching.

The axle hub 10 has a flange 11 and hub bolts 12 attached at circumferentially equispaced locations of the flange 11 for fixing a wheel disc. At the end of the outer joint member side of the axle hub 10 are formed an annular projection or a rim 13 and an end surface 14 with face splines. In the face spline part, a hardened layer 15 is formed by induction quenching or the like. The axle hub 10 has a cavity 16 opening at the end of the anti-outer joint member side, and a through-hole 17 axially extending through the axle hub 10 to merge into the through-hole 17 via a spot face 18. One of double rows of inner raceways 33a and 33b, i.e. an inner raceway 33a is formed in the outer circumference of the axle hub 10. In this inner raceway part, a hardened layer 19 is formed by induction quenching or the like. The hatched regions in the drawing show the hardened layers, the hardened layer 19 of the inner raceway part and the hardened layer 15 of the face spline part being connected to each other.

The outer joint member 20 is in the shape of a bowl with axially extending ball grooves 22 formed at circumferentially equispaced positions of the inner spherical surface 21. The ball grooves 22 are for the rolling of torque transmission balls, and a hardened layer 23 is formed as by induction quenching, as shown by the dense hatched region in the drawing. In the central part of the outer joint member 20 is formed an axially extending through-hole 24. The other of the double rows of inner raceways 33a and 33b of the axle bearing 30, i.e. an inner raceway 33b is formed in the outer circumference of the outer joint member 20. In this inner raceway part, too, a hardened layer 25 is formed as by induction quenching, as shown by the coarse hatched region. The cross hatched region shows the portion where a heat-affected zone incident to the hardened layer of the inner raceway part and a heat-affected zone incident to the hardened layer of the ball groove part interconnect with each other. An end surface 26 of the outer joint member 20 opposing the axle hub 10 is formed with face splines. In this face spline part, too, a hardened layer 27 is formed as by induction quenching, the hardened layer 25 of the inner raceway part and the hardened layer 27 of the face spline part merging into each other as shown. An annular step 28 is formed at the end surface of the outer joint member 20.

The axle bearing 30 is composed of an outer ring 31 having double rows of outer raceways 32a and 32b, double rows of inner raceways 33a and 33b, and double rows of rolling elements 34a and 34b. As mentioned above, one 33a of the duplex rows of inner raceways is formed in the axle hub 10, and the other 33b in the outer joint member 20. The outer ring 31 is fixed to the car body through a flange 35. Because of angular ball bearing structure as shown in the drawing, the bearing has a large load capacity.

The linkage structure of the axle hub 10 and outer joint member 20 is such that a fixing bolt 40A is inserted into the through-hole 17 of the axle hub 10 and through-hole 24 of the outer joint member 20 from the outer joint member 20 side, and a nut 41 is put on to the threads of the fixing bolt 40A projecting out of the axle hub 10 to tighten them up.

The axle hub 10 and outer joint member 20 are designed so as not to rotate relatively by means of the face splines. That is, the face splines formed at the end surface 14 of the axle hub 10 and the face splines formed at the end surface 26 of the outer joint member 20 are engaged with each other to transmit the torque.

The axle hub 10 and outer joint member 20 are fitted in a socket-and-spigot joint fashion. That is, the inner diameter of the rim 13 of the axle hub 10 and the outer diameter of the annular step 28 of the outer joint member 20 are set to result in proper fits, ensuring that the double rows of inner raceways 33a and 33b are aligned. This alignment is of great significance to the performance of the axle bearing 30, especially where the double rows of inner raceways 33a and 33b are formed on the separate members, that is, the axle hub 10 and outer joint member 20.

Figure 2:
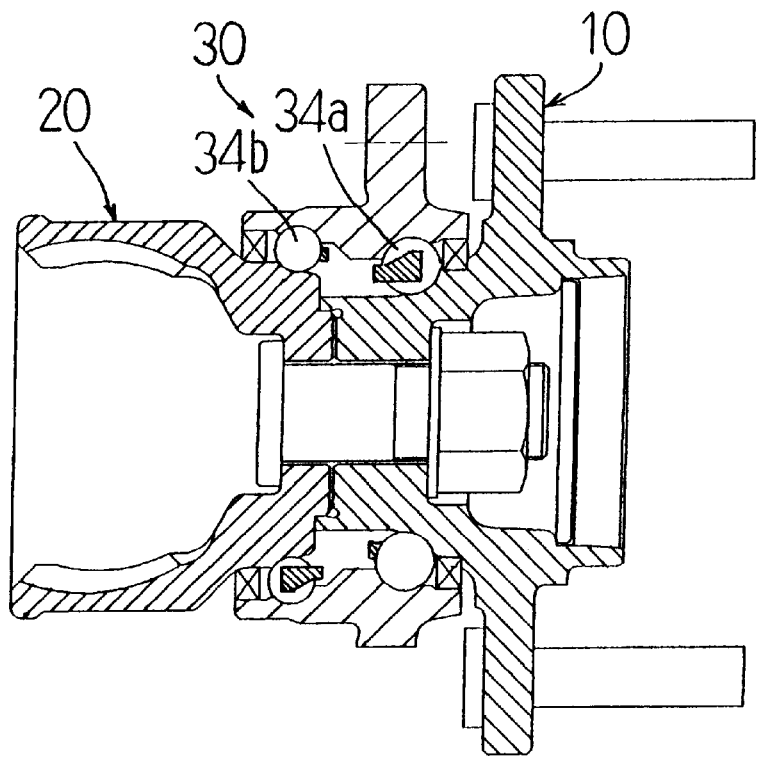

FIG. 2 shows a modification in which of the double rows of balls 34a and 34b, the balls 34b rolling on the inner raceway 33b formed in the outer joint member 20 has a larger pitch circle diameter, while the number of balls is increased with a smaller ball diameter. Since the inboard ball row is on the outer joint member 20 for receiving the torque from the driving shaft, the load condition is severer as compared with the outboard ball row. Hence, an increase in the load capacity of the inboard ball row is particularly effective for enhancing the durability.

Figure 3:
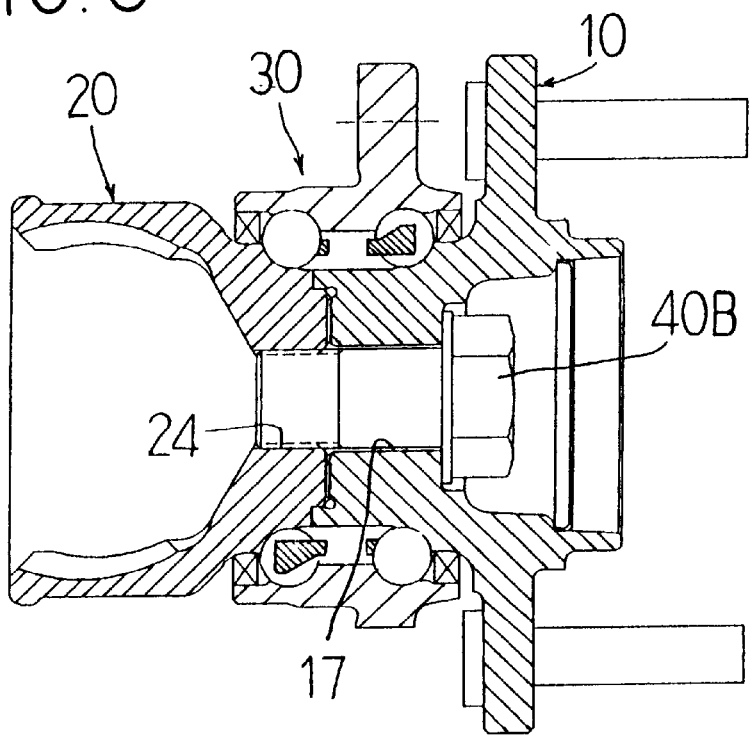

FIG. 3 shows a modification in which female threads are formed in the through-hole 24 of the outer joint member 20 so that the axle hub 10 and the outer joint member 20 are coupled by means of a fixing bolt 40B inserted from the through-hole 17 side of the axle hub 10.

Figure 4:
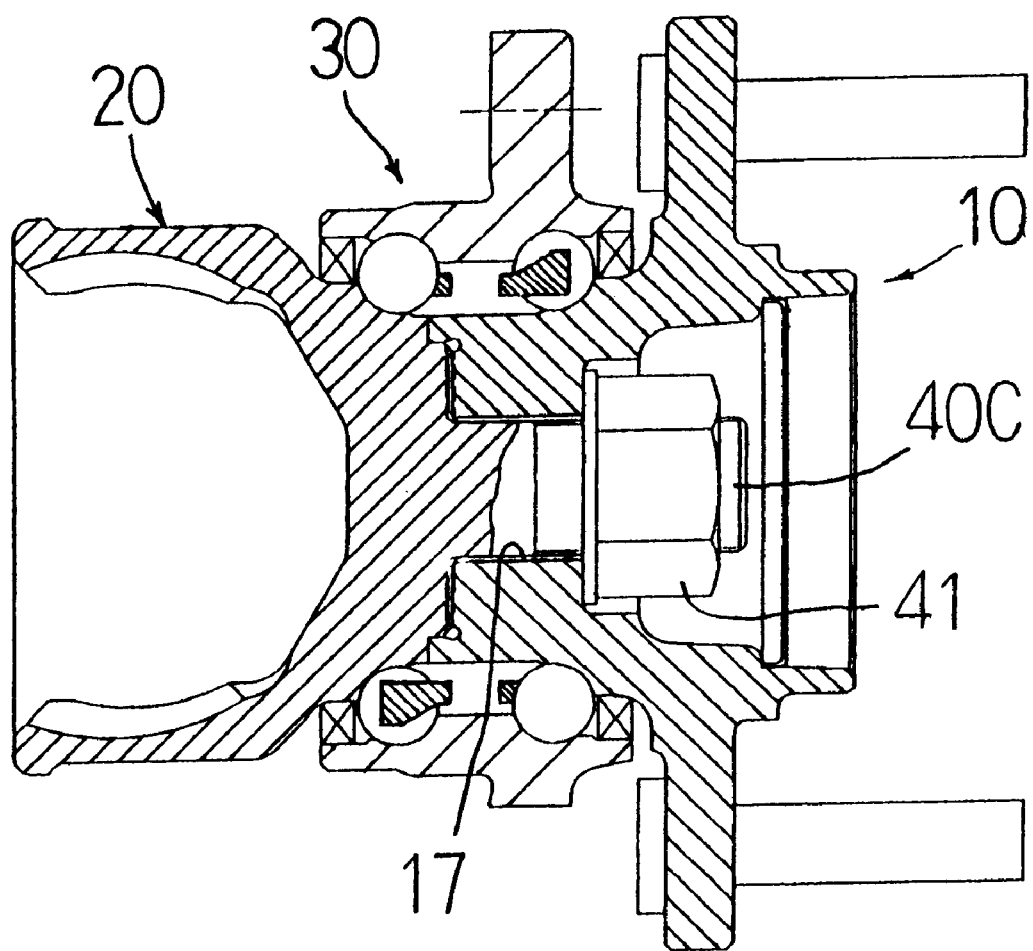

FIG. 4 shows a modification in which the outer joint member 20 has a shank 40C with male threads. The shank is inserted into the through-hole 17 of the axle hub 10, so that by tightening a nut 41 onto the male threads in the shank 40C projecting out of the axle hub, the axle hub 10 and outer joint member 20 are joined together. Herein, the shank 40C of the outer joint member 20 is formed integrally with the bowl-shaped part or the mouth of the outer joint member.

Figure 5:
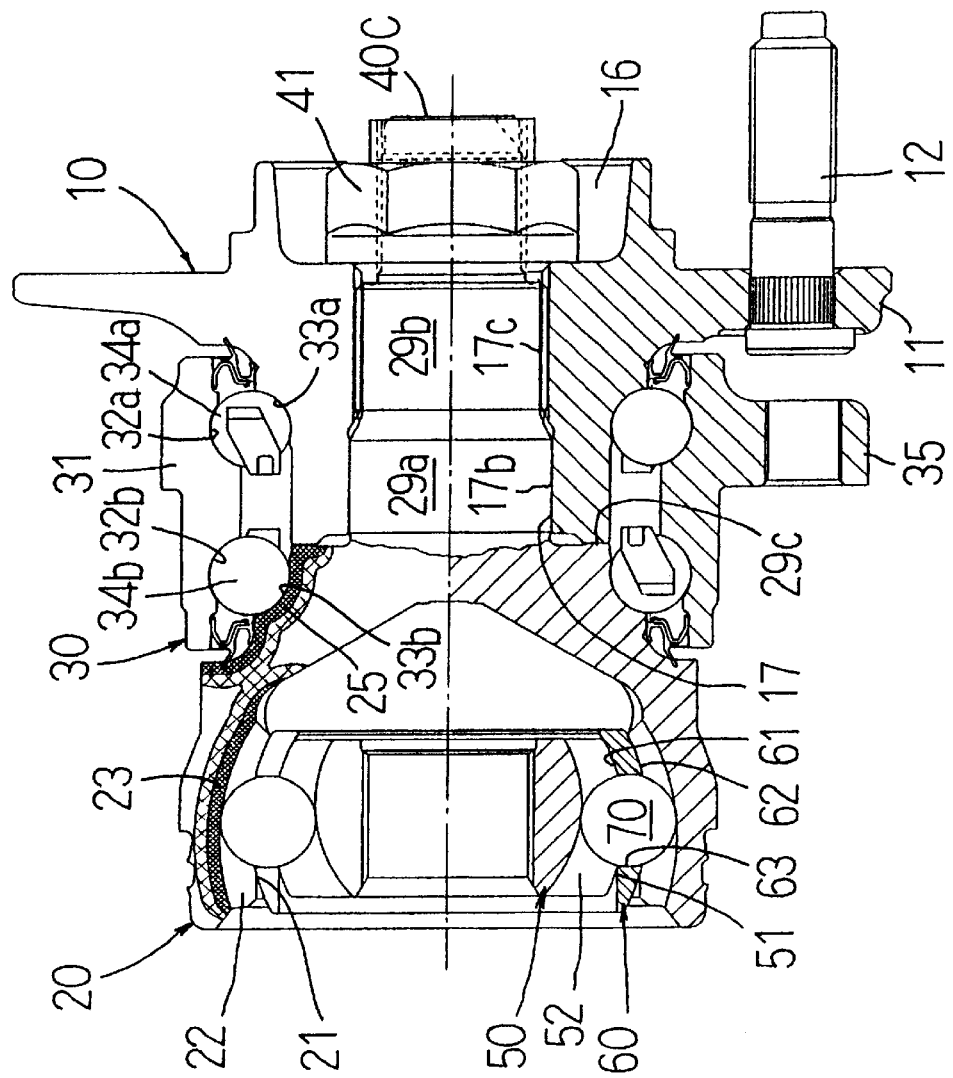

FIG. 5, shows a modification in which the outer joint member 20 has the bowl-shaped mouth and shank 40C with male threads cut in its end, which is the same as in FIG. 4. The shank further includes a fitting part 29a and a spline part 29b with external splines. Radially extending at the end on the mouth part side of the fitting part 29a is the abutting surface 29c. In FIG. 5, for the sake of clarity, the lower half is shown in an ordinary sectional view, and the upper half is cross-hatched to show the hardened layer and heat-affected layer. The hardened layer is indicated by dense cross hatching, while the heat-affected layer by coarse cross hatching. As shown, the quench-hardened layer 25 is formed on the surface of the outer joint member 20 to extend from the inner raceway 33b to the abutment surface 29c, and the heat-affected layer of the hardened layer 25 is connected to the heat-affected layer of the quench-hardened layer 23 of the ball groove 22.

In the through-hole 17 of the axle hub 10, the fitting part 17b and spline part 17c with internal splines are formed at axial positions corresponding to the fitting part 29a and spline part 29b of the outer joint member 20. By tightening the nut 41 on to the male threads of the shank 40C projecting out of the through-hole 17 of the axle hub 10, the axle hub 10 and outer joint member 20 are separably joined together. In this case, the torque is transmitted through the fitting parts 17b and 29a and spline parts 17c and 29b, instead of the face splines 14 and 26.

In the mouth of the outer joint member 20 are installed an inner joint member 50, a cage 60, and torque transmission balls 70. The inner joint member 50 has a splined hole for connection with the driving shaft (not shown), and a plurality of axially extending ball grooves 52, corresponding to the ball grooves 22 of the outer joint member 20, at circumferentially equispaced locations of an outer spherical surface 51. Each of the torque transmission balls 70 are interposed between a pair of the ball groove 22 of the outer joint member 20 and the ball groove 52 of the inner joint member 50, so that the torque is transmitted between the two. Each torque transmission ball 70 is retained in a pocket 63 of the cage 60. The cage 60 has inner and outer spherical surfaces 61 and 62 for slidable engagement with the outer spherical surface 51 of the inner joint member 50 and the inner spherical surface 21 of the outer joint member 20, respectively, thereby ensuring the constant velocity of the joint with the torque transmission balls 70 in a plane bisecting the angle between the two axes being coupled by the joint. The basic structure and function of the constant velocity universal joint described herein are commonly applicable to all embodiments.

FIG. 6 shows a modification in which plural through-holes 17a and 24a arranged in a circular pattern are provided in the axle hub 10 and outer joint member 20, so that by inserting fixing bolts 40D from the outer joint member 20 side and tightening nuts 42 on to the threads of the fixing bolt 40D projecting out of the axle hub 10, the axle hub 10 and the outer joint member 20 are joined together. Arranging the through-holes 17a and 24a for the fixing bolts 40D in a circular pattern provides a hollow space (17, 24) in the central part. As a result, not only the weight is reduced, but also the cooling condition for the axle bearing 30 is improved. In this case, in relation to the formation of hollow space, an end plate 43 is provided in order to prevent any leakage of grease with which the outer joint member 20 is stuffed. The end plate 43 also serves as a washer for the fixing bolts 40D as shown. FIG. 7A shows the shape of the face splines formed at uniform intervals on the end surfaces of the axle hub 10 and outer joint member 20 opposing each other. Alternatively, the face splines may be so arranged as to avoid the area of the through-holes 17a and 24a as shown in FIG. 7B.

FIG. 8 shows a modified arrangement similar to the FIG. 6 arrangement in that the axle hub 10 and outer joint member 20 are joined together by means of plural fixing bolts 40E arranged in a circular pattern, but without using nuts, female threads being formed, instead, in the through-holes 24b of the outer joint member 20 to receive the fixing bolts 40E inserted from the through-holes 17a of the axle hub 10. In this case, an annular washer 44 having plural through-holes for allowing the fixing bolts 40E to pass therethrough is used. Herein, also, a hollow space is created, with an end plate 45 being attached. Another end plate 46 is preferably attached to the cavity 16 of the axle hub 10 in order to prevent water or foreign matter getting in.

Figure 10:
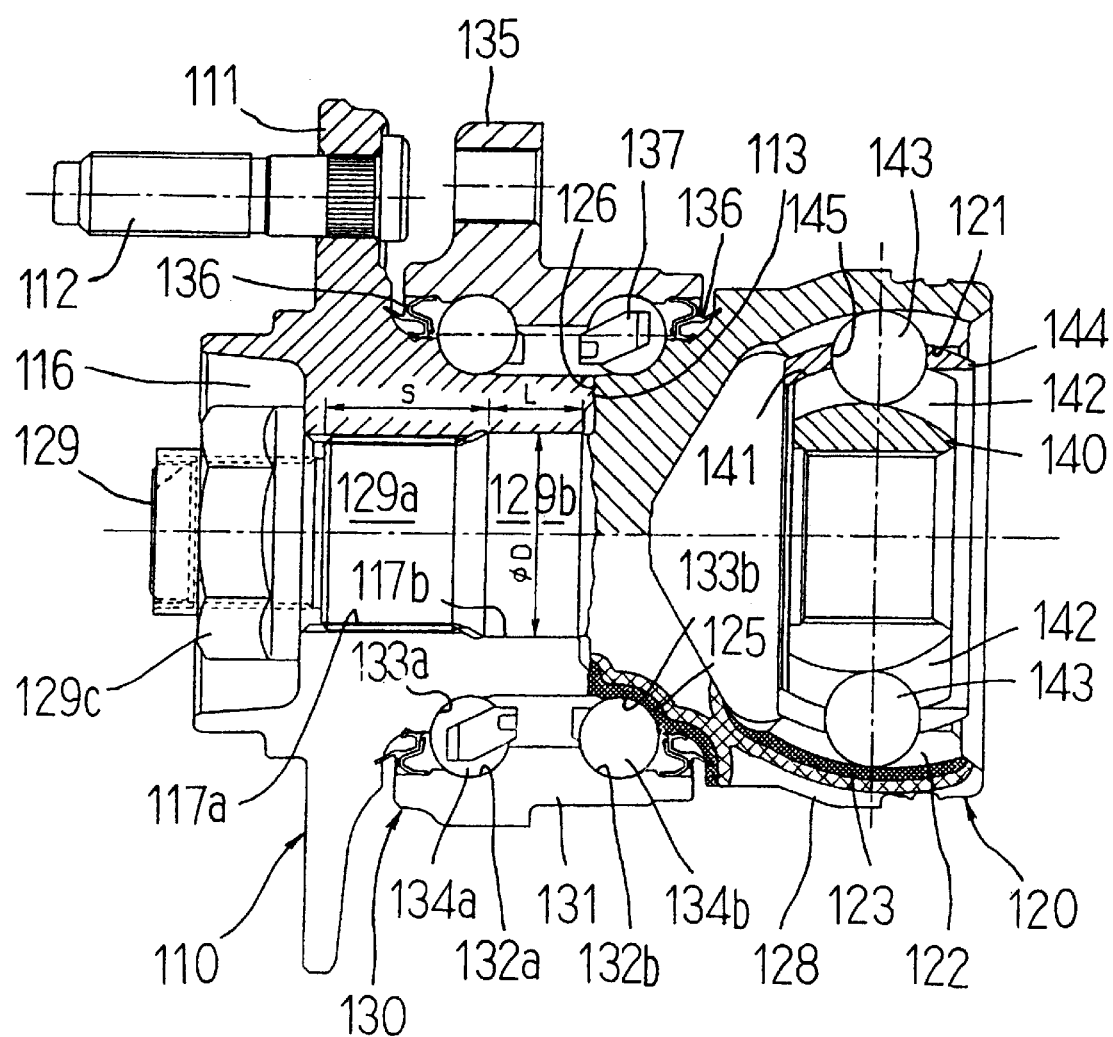
FIG. 10 is a longitudinal sectional view of a hub unit bearing according to another embodiment of the invention.

A hub unit bearing as shown in FIG. 10 comprises an axle hub 110, an outer joint member 120 of constant velocity universal joint, and an axle bearing 130 assembled into a unit. The axle bearing 130 is composed of an outer ring 131 having double rows of outer raceways 132a and 132b, double rows of inner raceways 133a and 133b, and double rows of rolling elements 134a and 134b. In the example shown herein, one 133a of the double rows of inner raceways 133a and 133b is formed in the outer circumference of the axle hub 110, and the other 133b is formed in the outer circumference of the outer joint member 120. Alternatively, other ring (inner race ring) having a raceway may be fitted to the axle hub 110 and/or outer joint member 120. The outer ring 131 is fixed to the car body of the vehicle through a flange 135. The illustrated embodiment is of the angular contact ball bearing structure, and hence the bearing load capacity is large. It is also possible to employ the double-row conical roller bearing structure. At each end openings of the axle bearing 130 is provided a seal 136, for preventing entrance of foreign matter from outside or leak of grease contained inside.

The axle hub 110 has a flange 111 with hub bolts 112 for fixing the wheel base at equal intervals in the circumferential direction of the flange 111. On the outer circumference of the axle hub 110 is formed one 133a of the double rows of inner raceways. A hardened layer is formed in the inner raceway as by induction quenching. At the end of the axle hub 110 on the outer joint member side, an annular convex edge or a rim 113 is formed on the outer circumference. The axle hub 110 has a cavity 116 opening at the end on the anti-outer joint member side, a through-hole axially extending through the central part of the axle hub 110.

The outer joint member 120 has a substantially bowl-shaped mouth 128, and a shank 129 formed integrally with the mouth 128. The mouth 128 has axially extending ball grooves 122 at circumferentially equispaced positions of an inner spherical surface 121 thereof. Each of the ball grooves 122 on which balls 143 roll, has a hardened layer 123 formed as by induction quenching. One 133b of the double rows of inner raceways of the axle bearing 130 is formed in the outer circumference of the outer joint member 120.

In the mouth 128 of the outer joint member 120, an inner joint member 140, balls 143, and a cage 144 are assembled. The inner joint member 140 is connected to a driving shaft (not shown) by means of serrations or splines for transmission of power from the engine. Ball grooves 142 corresponding in number to the ball grooves 122 of the outer joint member 120 are provided at circumferentially equispaced positions of an outer spherical surface 141 thereof. Each of the balls 143 is interposed between a pair of the ball groove 122 of the outer joint member 120 and the ball groove 142 of the inner joint member 140 to thereby transmit torque between the two members. Each ball 143 is received in each of the pockets 145 of the cage 144. The cage 144 is interposed between the inner spherical surface 121 of the outer joint member 120 and the outer spherical surface 141 of the inner joint member 140, ensuring the constant velocity of the two axes being coupled by the joint by orienting the balls 143 in a plane bisecting the angle between the two axes.

The shank 129 of the outer joint member 120 has a serrated part 129a and a cylindrical fitting part 129b with screw threads cut in the end thereof. The end surface 126 of the mouth 128 on the shank side, that is, the radially extending surface at the mouth side end of the fitting part 129b abuts against the rim 113 of the axle hub 110. The axial positions of the rim 113 and abutting surface 126 determine the distance between the double rows of the inner races 133a and 133b. Therefore, the bearing clearance (or preload) can be adjusted by increasing or decreasing the processing amount of one or both of the rim 113 and abutting surface 126.

In FIG. 10, for the sake of clarity, an ordinary sectional view is shown in the upper half from the center line, while hardened layers (heat-treated region) and heat-affected zones are shown in the lower half by cross hatching. The hardened layers are indicated by dense cross hatching, and the heat-affected layers by coarse cross hatching. As shown in the drawing, the hardened layer 125, formed in the surface of the outer joint member 120, extends from the inner raceway 133*b* to the sealing surace for the seal 136 and to the abutting part 126. The heat-affected zone incident to the hardened layer 125 and the heat-affected zone incident to the hardened layer 123 of the ball groove 122 are connected to each other.

In the through-hole of the axle hub 110, a serrated part 117*a* and a cylindrical fitting part 117*b* are formed at axial positions corresponding to the serrated part 129*a* and fitting part 129*b* of the outer joint member 120. A nut 129*c* is put on male threads of the shank 129 projecting from the through-hole of the axle hub 110 to separately join the axle hub 110 and outer joint member 120 together. The serrations have a helix angle so as to define an interference between the serrations, thereby eliminating any play in the circumferential direction. In this case, torque is transmitted by the serrated parts 117*a* and 129*a*. The fitting parts 117*b* and 129*b* serve to align the double rows of inner raceways 133*a* and 133*b*. This alignment is of great significance in order to ensure satisfactory bearing performance of the axle bearing 130 in which the double rows of inner raceways 133*a* and 133*b* are situated on separate members, that is, the axle hub 110 and outer joint member 120.

Figure 11:
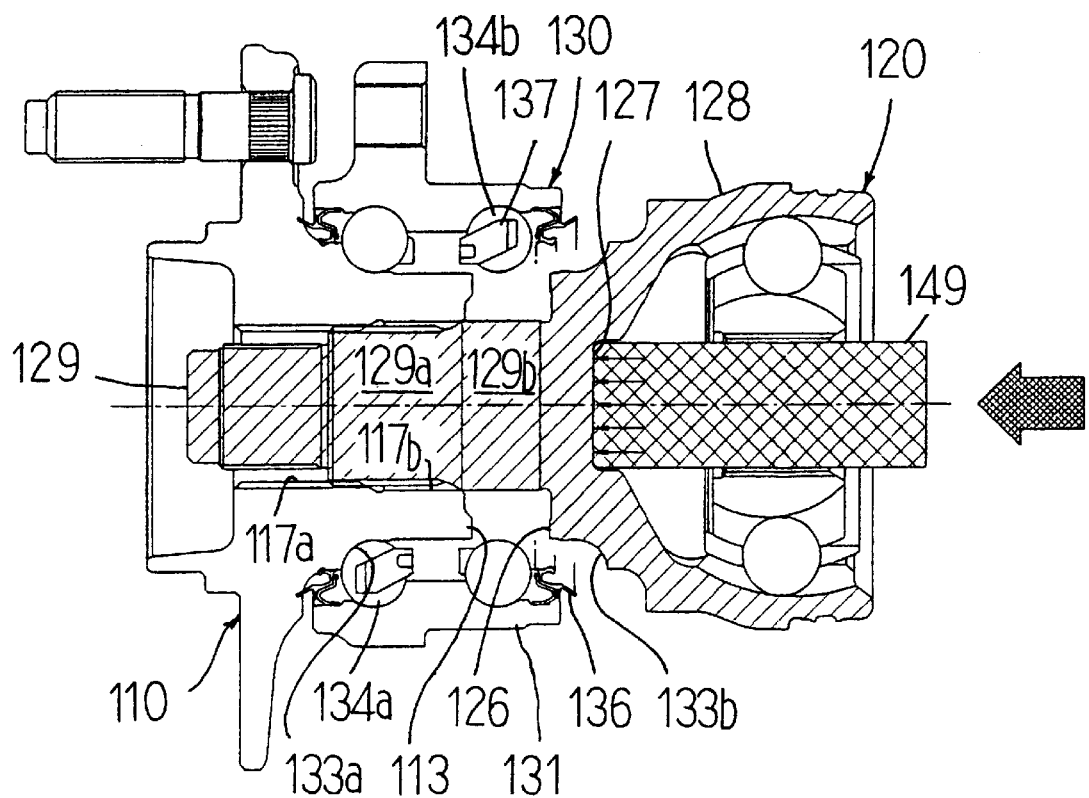
FIG. 11 is a longitudinal sectional view showing the process of press fitting of the hub unit bearing shown in FIG. 10.

For assembling the hub unit bearing in FIG. 10, the axle hub 110 and axle bearing 130 are assembled first, when the outer joint member 120 is assembled in the axle hub 110, as shown in FIG. 11. Until the outer joint member 120 is assembled, one 133*b* of the inner raceways 133*a* and 133*b* is not provided, and therefore one row of the rolling elements is held by the cage 137. When the shank 129 of the outer joint member 120 is inserted into the through-hole of the axle hub 110, the serrated parts 117*a* and 129*a* come into contact first, whereupon the axle hub 110 and outer joint member 120 are so adjusted as to match the serrations in the circumferential direction and it is further pushed in the axial direction. In succession, forced insertion into the fitting part 117*b* begins. Press-fitting is finished when the abutting surface 126 of the outer joint member 120 comes into contact with the rim 113 of the axle hub 110.

The relation of the length (S) of serrated parts 117*a* and 129*b* and the length (L) of the fitting parts 117*b* and 129*b* is S>L (FIG. 10). Accordingly, start of engagement of the serrated parts 117*a* and 129*a* precedes that of the fitting parts, which facilitates phase matching in the circumferential direction of the serrated parts 117*a* and 129*a*.

Since the fitting parts 117*b* and 129*b* are situated between the double rows of rolling elements 134*a* and 134*b*, as shown in the drawing, any change in the outside diameter of the axle hub 110 due to interference of the fitting parts will not affect the inner raceway 134*a*. The length (L) of the fitting parts 117*a* and 129*a* is ¼ or more of the shank outer diameter (D). The degree of interference (I) of the fitting parts 117*a* and 129*a* is set in a range of $0 \mu m \leq I \leq 60 \mu m$. The lower limit is defined $0 \mu m$ in order to ensure the rigidity of the bearing. The upper limit is defined $60 \mu m$ in order to keep the total press-fitting force of the serrated parts 117*a* and 129*a* and the fitting parts 117*b* and 129*b* smaller than the axial tightening force by the nut 129*c* so that tightening by the nut 129*c* is effective.

In the outer joint member 120 shown in FIG. 11, a flat part 127 is provided in the bottom of the mouth 128 to receive the end of a press-fitting jig 149 so that the force applied by the jig fully acts in the axial direction, facilitating the press-fitting operation without twisting or damaging of parts.

Figure 12:
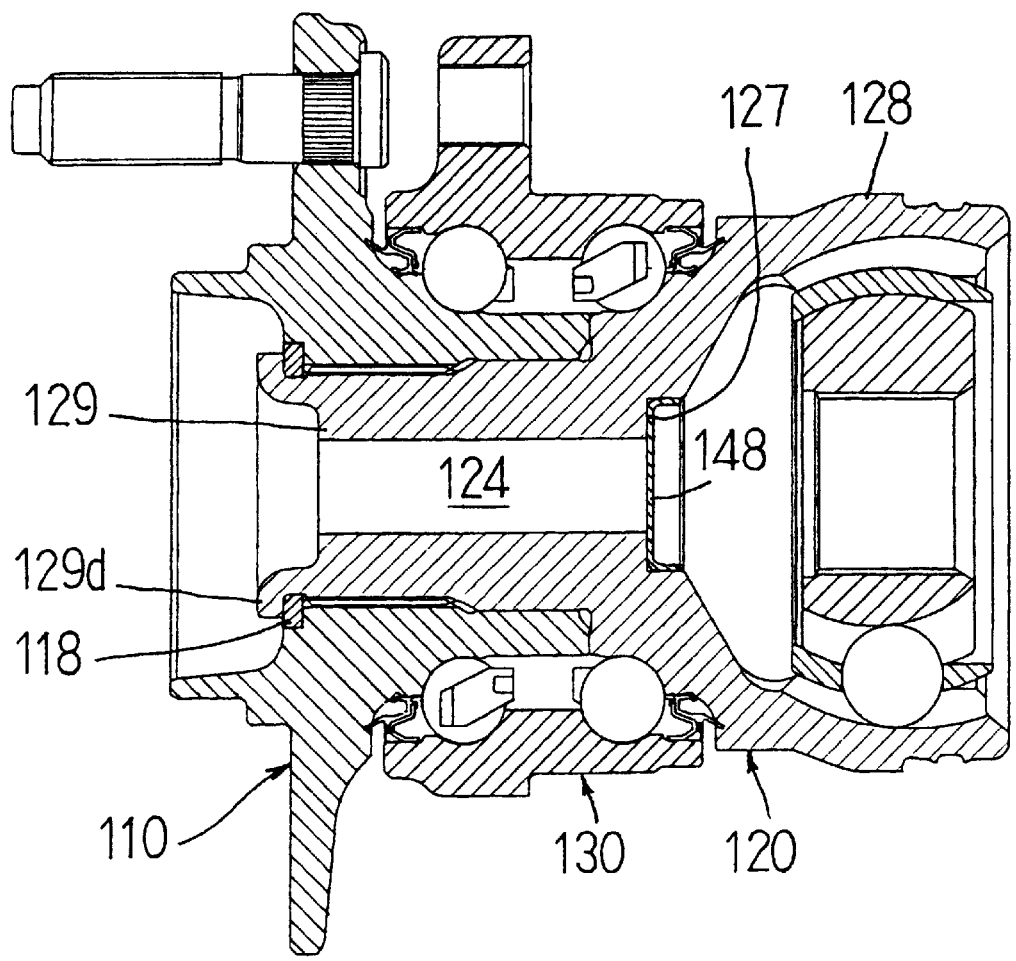
FIG. 12 is a longitudinal sectional view similar to FIG. 10, showing a modified arrangement.

FIG. 12 shows a modification in which the shank 129 of the outer joint member 120 is of a hollow tubular form, the outer joint member 120 and the axle hub 110 being joined together by staking the shank end as at 129*d*. An annular step is formed at the end of a through-hole of the axle hub 110 to receive a spacer ring 118, and the staking is effected with the spacer ring 118 embraced. Alternatively, the end of the shank 129 may be directly staked onto the end of the through-hole of the axle hub 110 without the use of the spacer ring 118. A hollow space 124 in the shank 129 brings about benefits such as reduction of weight and alleviation of cooling condition. An end plate 148 is attached to the flat part 127 in the bottom of the mouth 128 to prevent grease packed in the mouth 128 from leaking out.

Figure 9:
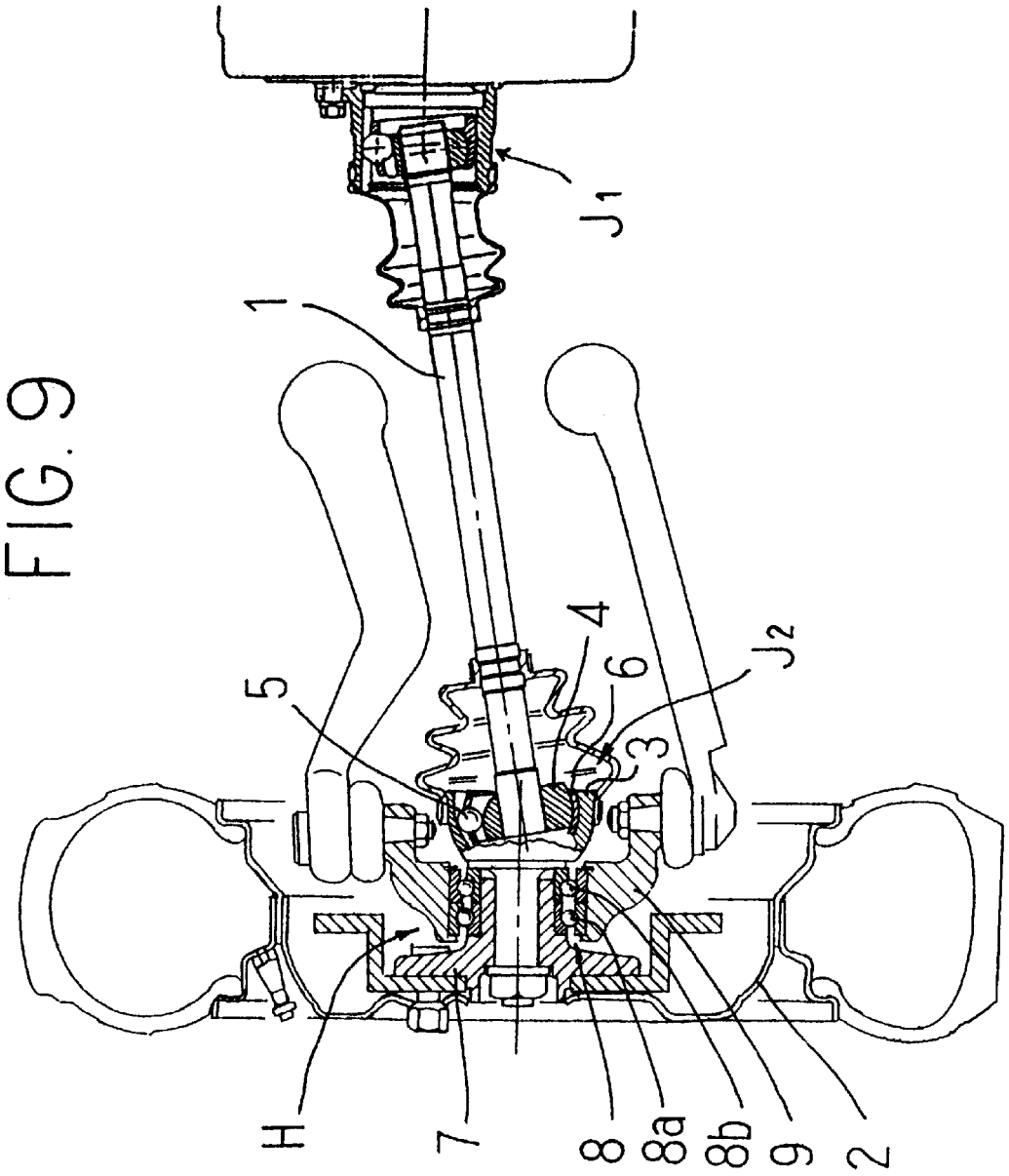
FIG. 9 is a longitudinal sectional view showing the conventional hub unit bearing.
Figure 13:
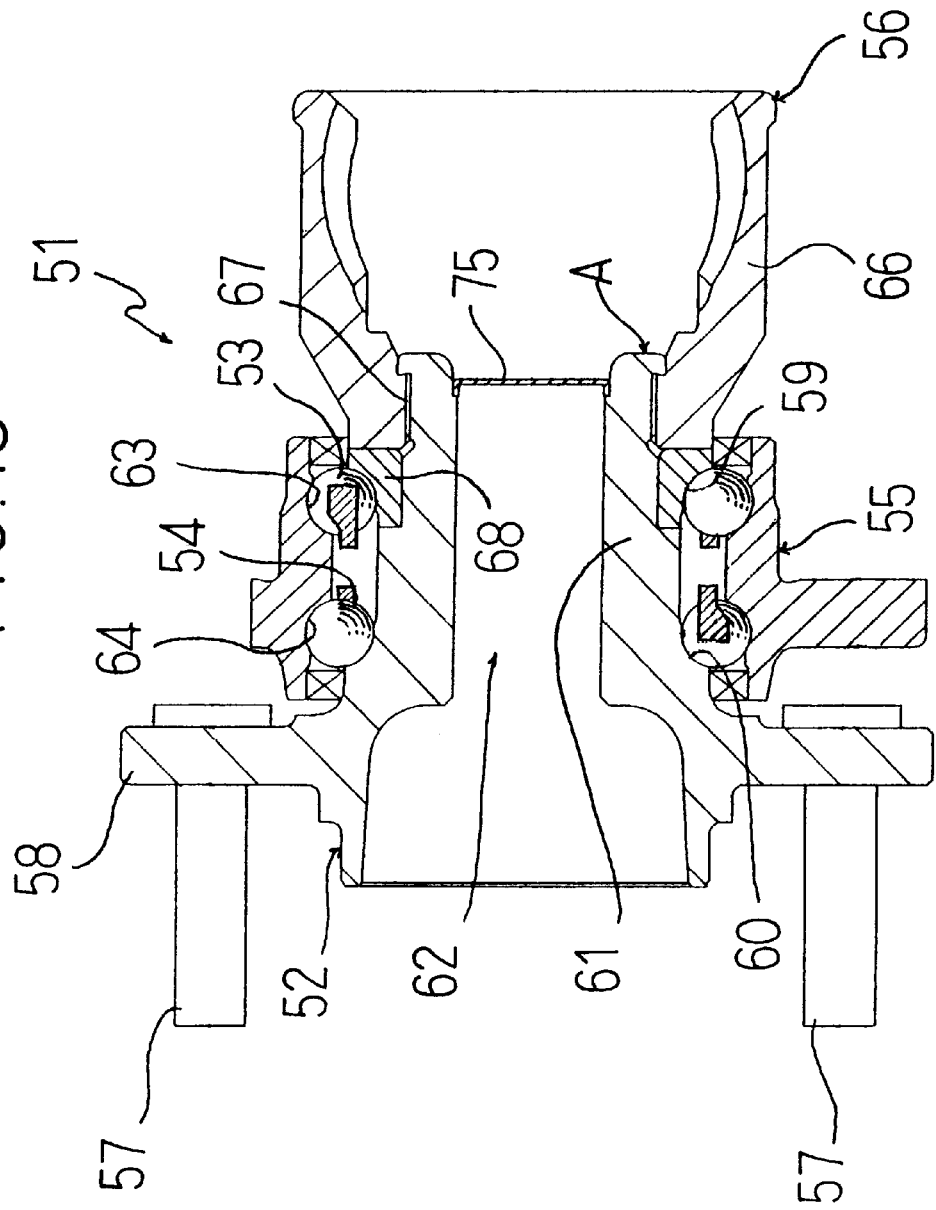
FIG. 13 is a sectional view of a hub unit bearing according to another embodiment of the invention.

A hub unit bearing 51 shown in FIG. 13 is composed of an axle hub 52 coupled to the driving wheel 2 (see FIG. 9) together with a brake rotor (not shown), an axle bearing 55 for rotatably supporting the axle hub 52 through double rows of rolling elements 53 and 54 (balls in the illustrated example), and an outer joint member 66 of a constant velocity universal joint 56 coupled to the axle hub 52 for transmitting the power from the driving shaft 1 (FIG. 9) to the axle hub 52.

The axle hub 52 has a flange 58 with hub bolts 57 at one end, and a shank 61 positioned at the other end with double rows of inner raceways 59 and 60 of the axle bearing 55 formed on the outer surface of thereof. The shank 61 of the axle hub 52 is in a tubular hollow structure opening throughout its length to form a tubular hollow space 62. This axle hub 52 is inserted into the inner side of the brake rotor, and is coupled to the driving wheel 2 together with the brake rotor by means of the hub bolts 57.

The axle bearing 55 forms double rows of outer raceways 63 and 64, and double rows of rolling elements 53 and 54 are interposed between the outer raceways 63 and 64 and the inner raceways 59 and 60 of the axle hub (the vehicle inboard raceway 59 and vehicle outboard raceway 60).

The constant velocity universal joint 56 is composed of an inner joint member connected to one end of the driving shaft 1 (see FIG. 9), torque transmission balls, a cage for retaining the balls (neither shown), and an outer joint member 66, an axial opening 67 being formed at one end of the outer joint member 66. In the drawing, reference numeral 75 disignates a cover for partitioning the hollow space 62 and the inside space of the outer joint member 66.

Figure 14:
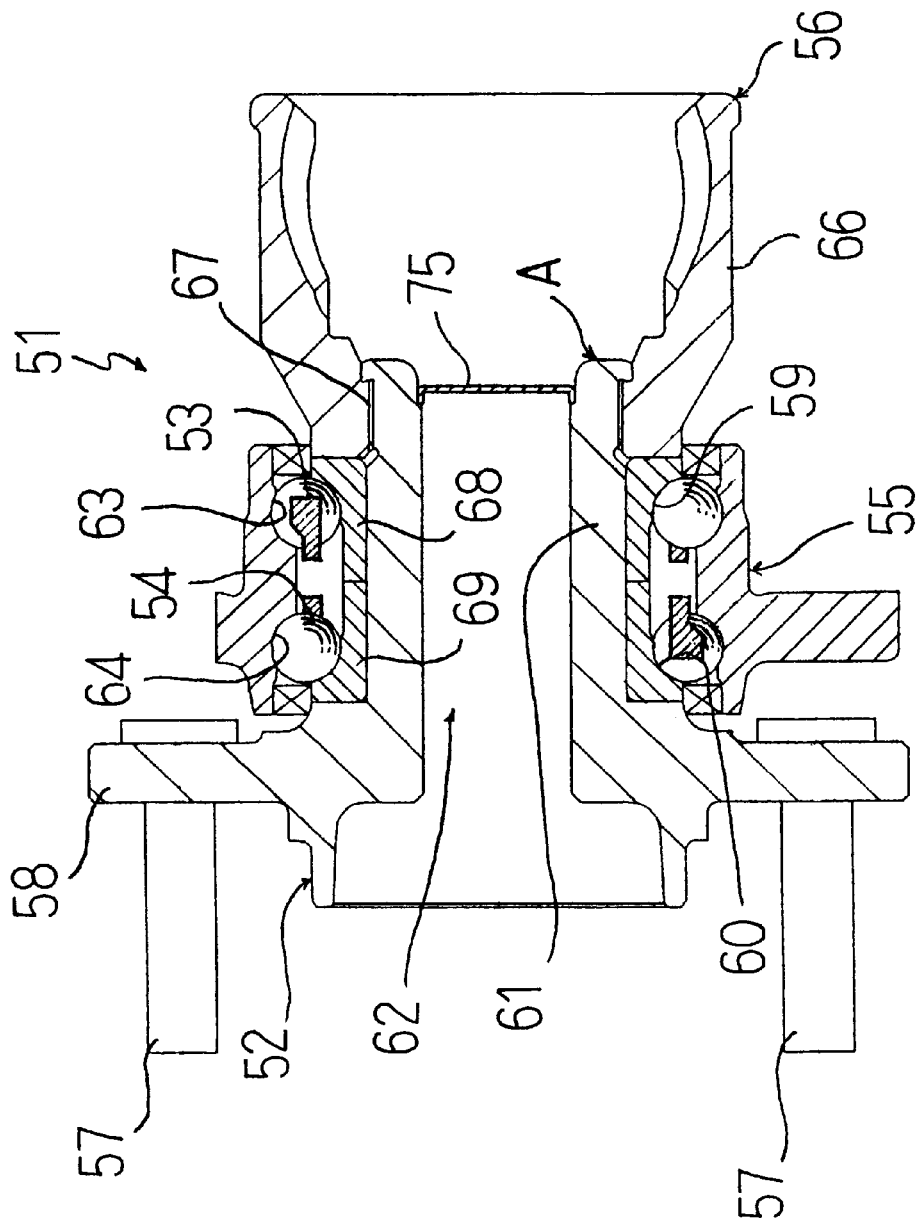
FIG. 14 and FIG. 15 are views similar to FIG. 10 showing modified arrangements, respectively.

In the embodiment shown in FIG. 13, of the double rows of inner raceways 59 and 60 formed on the outer surface of the shank 61 of the axle hub 52, the inboard raceway 59 is formed in an inner raceway ring 68 separate from the axle hub 52. As shown in FIG. 14, also the outboard raceway 60 may be formed in an inner raceway ring 69 separate from the axle hub 52.

Figure 15:
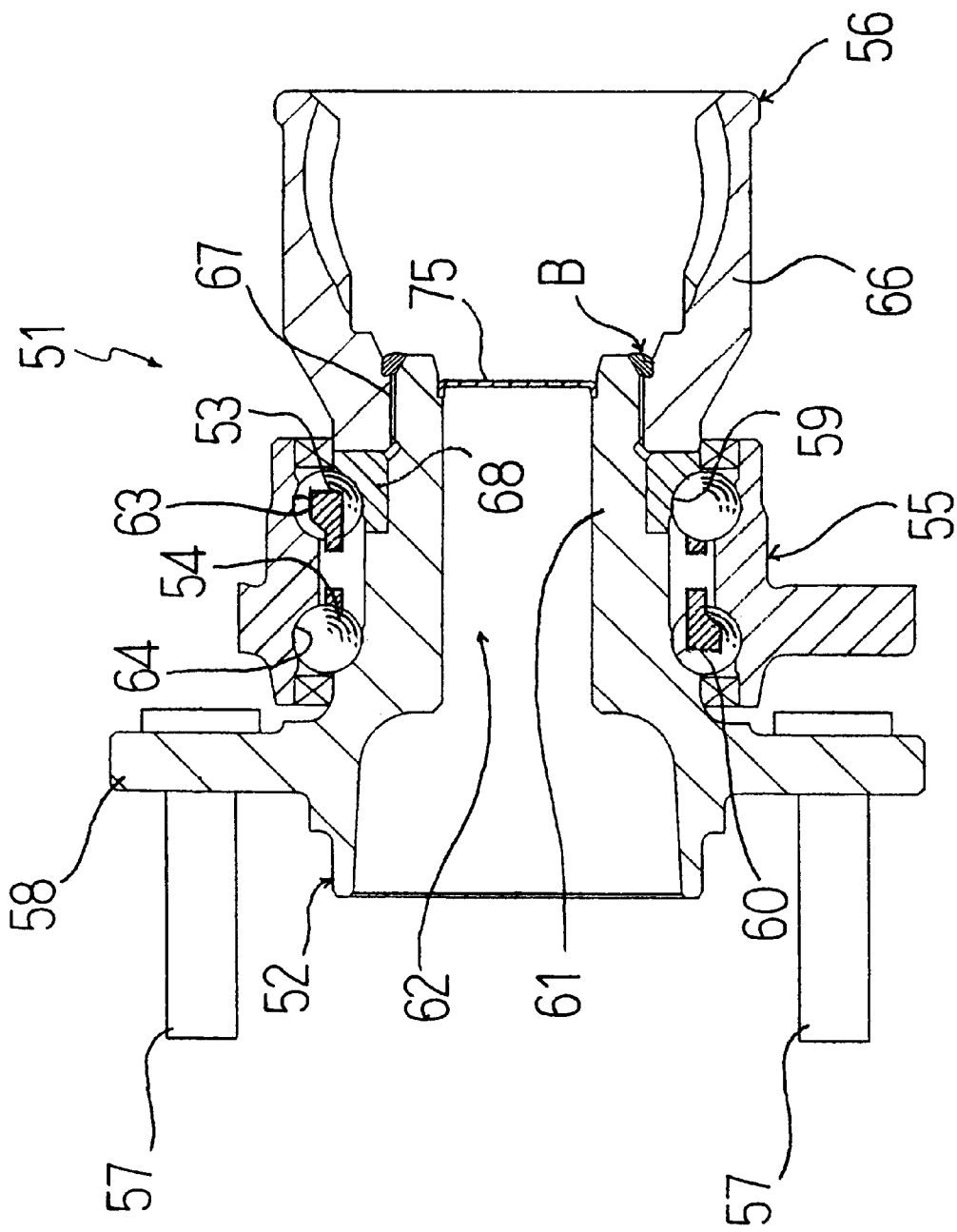

In the embodiment in FIG. 13, the shank 61 of the axle hub 52 is press-fitted into the opening 67 of the outer joint member 66, and the leading end of the shank 61 is staked against the peripheral edge of the opening 67 of the outer joint member 66 as at A in the drawing, so that the axle hub 52 and outer joint member 66 are joined together. FIG. 15 shows a modification in which the axle hub 52 and the outer joint member 66 are joined together by welding as at B in the drawing.

Figure 16A:
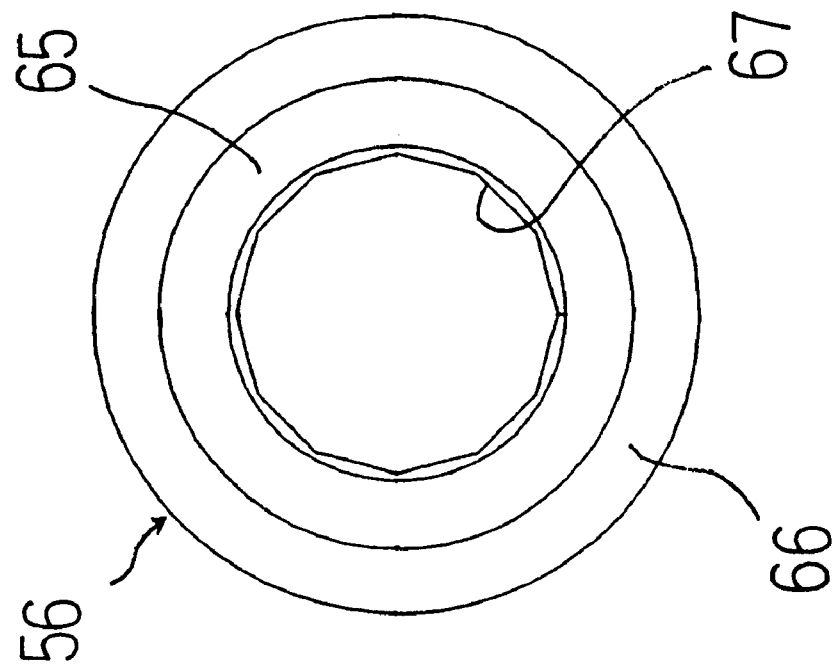
FIG. 16A is an end elevation of an outer joint member with a serrated opening.
Figure 16B:
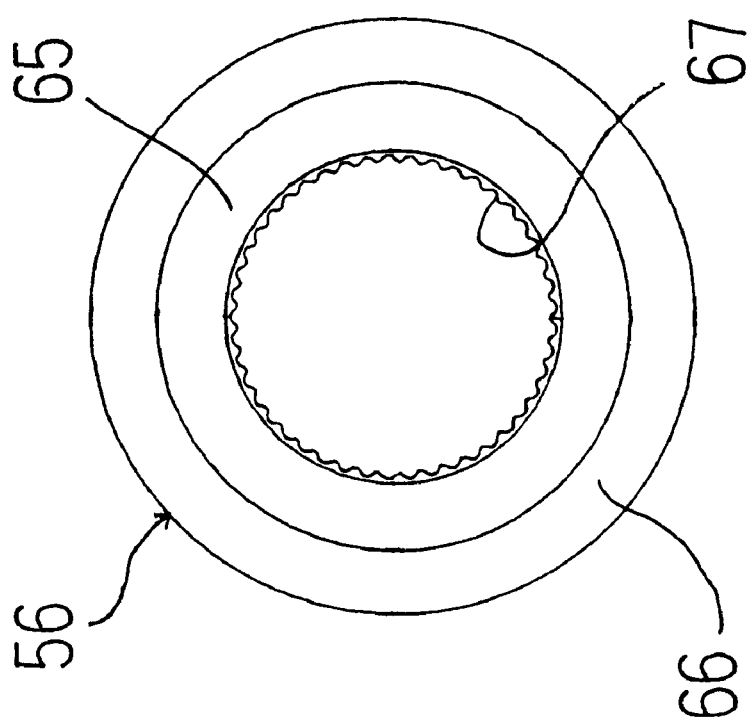
FIG. 16B is an end elevation of an outer joint member with an opening in a polygonal cross-section.

In the case the inner surface of the opening 67 of the outer joint member 66 is serrated (see FIG. 16A) or in a polygonal cross-section (see FIG. 16B), press-fitting of the shank 61 of the axle hub 52 into the opening 67 causes the shank 61 to plastically deform so that the inner surface shape of the opening 67 is transferred to the shank 61, ensuring firm coupling. In this case, the opening 67 of the outer joint member 66 is preferably composed of a material of a higher hardnesses than the shank 61.

Specifically, coupling of the outer joint member 66 and the axle hub 52 is executed in the following procedure. First, as shown in FIG. 17, the axle hub 52 and the outer joint member 66 are positioned coaxially by means of a positioning tool 70 having a large end 71 and a small end 72 at its leading end, the outer joint member 66 being arrested at a shoulder of the large end 71, and the small end 72 being inserted into the hollow space 62 of the shank 61 of the axle hub 52. In this state, a press-fitting tool 73 is inserted from the open end of the axle hub 52 so that the leading end of the press-fitting tool 73 abuts on the peripheral edge of the hollow space 62 of the axle hub 52. Subsequently pressing this press-fitting tool 73 (see the arrow in the lower half of the drawing), the shank 61 of the axle hub 52 is press-fitted into the opening 67 of the outer joint member 66. At this time, if the opening 67 is serrated or in a polygonal cross-section as mentioned previously, the inner surface shape of the opening 67 is transferred to the shank 61 as a result of plastic deformation of the latter, thereby ensuring firm coupling. After the positioning tool 70 is removed, a tightening tool 74 is inserted as shown in FIG. 18 so that the leading end of the tightening tool 74 abuts on the leading end of the shank 61 protruding out of the opening 67. The leading end of the shank 61 is staked by the tightening tool 74 (see the arrow in the lower half of the drawing), so that the axle hub 52 and the outer joint member 66 are integrally joined.

Figure 19A:
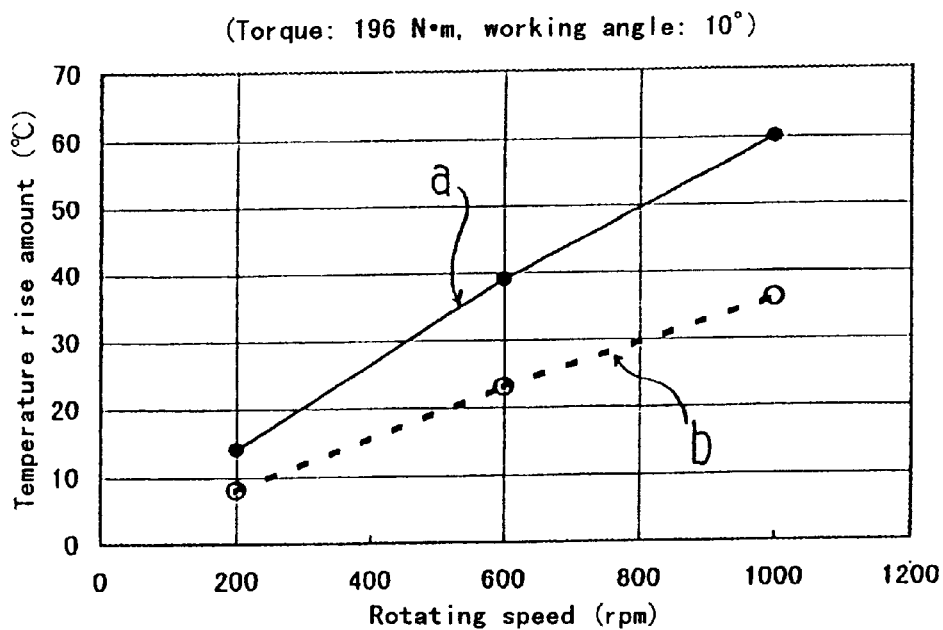
FIGS. 19A and 19B are diagrams showing temperature rise amount with various r.p.m.
Figure 19B:
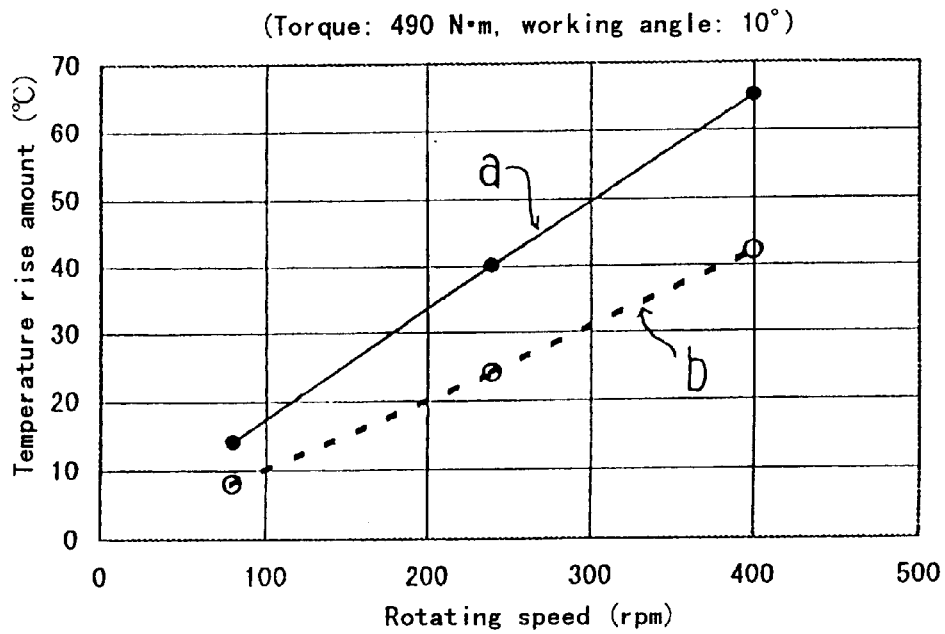

The tubular hollow structure of the shank 61 of the axle hub 52 provides a remarkable cooling effect, which will be evident from FIGS. 19A and 19B showing the amounts of temperature rise measured at the outer joint member 66. The shank of the hollow structure is evidently smaller in the temperature rise and efficient in cooling effect in the case of the invention indicated at b (broken line white spot in the diagram) when compared with the conventional product indicated at a (solid line dark spot in the diagram) with a solid shank.

What is claimed is:

1. A hub unit bearing comprising an axle hub, an outer joint member of constant velocity universal joint, and an axle bearing assembled into a unit, at least one of double row of inner raceways of the axle bearing being formed in the outer joint member, where a first hardened layer formed by quenching of the inner raceways of the outer joint member and a second hardened layer formed by quenching of ball grooves of the outer joint member are connected via a heat-affected zone incident to the first and second hardened layers.

2. A hub unit bearing of claim 1, wherein face splines are formed in opposing end surfaces of the axle hub and outer joint member, and a hardened layer of the inner raceway part and a hardened layer of the face spline part are connected.

3. A hub unit bearing of claim 1, wherein the axle hub and outer joint member are separably tightened in a socket-and-spigot joint fashion.

4. A hub unit bearing of claim 1, wherein the outer joint member has a bowl-shaped mouth and shank inserted through a through hole of the axle hub, the outer joint member has a serrated part and a fitting part, the axle hub having a serrated part and a fitting part corresponding to the serrated part and fitting part of the outer joint member such that the outer joint member and the axle hub are separably coupled together, wherein the outer joint member and axle hub are separably coupled by tightening a nut onto threads of the shank projecting from the axle hub.

5. A hub unit bearing comprising an axle hub, an outer joint member of constant velocity universal joint, and an axle bearing assembled into a unit, wherein at least one of double rows of inner raceways of the axle bearing is formed in the outer joint member, wherein the outer joint member has a mouth and a shank having a serrated part and a fitting part, an end face of the mouth on the shank side abutting against the axle hub, the axle hub having a serrated part and a fitting part formed therein that corresponds to the serrated part and fitting part of the shank such that the shank and the axle hub are separately coupled, the separable coupling being effected between the double rows of inner raceways of the axle bearing.

6. A hub unit bearing of claim 5, wherein the serrated parts of the shank and axle hub define an interference to eliminate any play in a circumferential direction, and has a length longer than a length of the fitting parts of the shank and axle hub.

7. A hub unit bearing of claim 6, wherein the length of the fitting parts of the shank and axle hub is not less than ¼ relative to a diameter of the fitting part of the shank, and a degree of interference is in a range of $0 \leq I \leq 60$ μm.

8. A hub unit bearing of claim 5, 6 or 7, wherein a bottom of the mouth of the outer joint member is provided with a flat part for receiving a pressing jig.

9. A hub unit bearing of claim 5, 6 or 7, wherein the outer joint member and the axle hub are joined together by staking an end of the shank of the outer joint member.

10. A hub unit bearing comprising an axle hub, an axle bearing for rotatably supporting said axle hub through double rows of rolling elements, and an outer joint member of a constant velocity universal joint coaxially coupled to said axle hub, wherein a shank of said axle hub has a tubular hollow structure throughout its length, the shank being fitted into an opening formed in the outer joint member, wherein the axle hub and the outer joint member are joined together by staking and welding.

11. A hub unit bearing of claim 10, wherein the opening in the outer joint member is serrated or in a polygonal cross-section, and the shank of said axle hub is press-fitted into the opening, causing the shank to plastically deform.

* * * * *